United States Patent
Kuwada (10) Patent No.: US 9,251,559 B2
(45) Date of Patent: Feb. 2, 2016

(54) IMAGE GENERATION DEVICE, CAMERA DEVICE, IMAGE DISPLAY DEVICE, AND IMAGE GENERATION METHOD

(71) Applicant: PANASONIC CORPORATION, Osaka (JP)

(72) Inventor: Junya Kuwada, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/499,809

(22) Filed: Sep. 29, 2014

(65) Prior Publication Data

US 2015/0015738 A1    Jan. 15, 2015

Related U.S. Application Data

(63) Continuation-in-part of application No. PCT/JP2013/002267, filed on Apr. 1, 2013.

(30) Foreign Application Priority Data

Apr. 2, 2012    (JP) .................................. 2012-084063

(51) Int. Cl.
| | |
|---|---|
| *G06T 3/00* | (2006.01) |
| *H04N 7/18* | (2006.01) |
| *H04N 5/232* | (2006.01) |
| *H04N 5/262* | (2006.01) |

(Continued)

(52) U.S. Cl.
CPC .......... *G06T 3/0018* (2013.01); *G06K 9/00791* (2013.01); *G06K 9/52* (2013.01); *G06T 3/00* (2013.01); *G06T 5/006* (2013.01); *H04N 5/23229* (2013.01); *H04N 5/23296* (2013.01); *H04N 5/2628* (2013.01); *H04N 7/183* (2013.01); *G06T 2210/22* (2013.01); *H04N 5/23238* (2013.01)

(58) Field of Classification Search
CPC .. H04N 5/2621; H04N 5/2624; H04N 5/2628
See application file for complete search history.

(56) References Cited

U.S. PATENT DOCUMENTS

| | | | | |
|---|---|---|---|---|
| 6,424,377 B1 * | 7/2002 | Driscoll, Jr. | ........... | G02B 13/06 |
| | | | | 348/207.99 |
| 6,552,744 B2 * | 4/2003 | Chen | ................. | H04N 5/23293 |
| | | | | 346/36 |

(Continued)

FOREIGN PATENT DOCUMENTS

| | | |
|---|---|---|
| JP | 2006-020141 | 1/2006 |
| JP | 2006-301034 | 11/2006 |

(Continued)

OTHER PUBLICATIONS

Search report from PCT/JP2013/002267, mail date is May 21, 2013.

*Primary Examiner* — Tuan Ho
(74) *Attorney, Agent, or Firm* — Greenblum & Bernstein, P.L.C.

(57) ABSTRACT

A camera device is provided with: an imaging unit for generating an area image obtained by shooting an area from above; and a display image generation unit for generating a display image of a target moving in the area using a clip image which is clipped from the area image. In this case, a rotation angle of a current frame is calculated on the basis of the rotation angle of the previous frame and a reference angle of the current frame. As a result, a rapid change in an orientation of the target displayed in the display image can be suppressed.

13 Claims, 7 Drawing Sheets

(51) Int. Cl.
*G06T 5/00* (2006.01)
*G06K 9/52* (2006.01)
*G06K 9/00* (2006.01)

(56) References Cited

U.S. PATENT DOCUMENTS

| | | | |
|---|---|---|---|
| 8,106,967 B2 * | 1/2012 | Tsuchiya | H04N 5/232 348/239 |
| 2006/0232699 A1 | 10/2006 | Suto et al. | |
| 2010/0053325 A1 | 3/2010 | Inagaki | |
| 2012/0236024 A1 | 9/2012 | Fujii et al. | |
| 2013/0057546 A1 | 3/2013 | Watanabe et al. | |
| 2013/0222646 A1 | 8/2013 | Tsubota et al. | |

FOREIGN PATENT DOCUMENTS

| | | |
|---|---|---|
| JP | 2008-033607 | 2/2008 |
| JP | 2010-062790 | 3/2010 |

* cited by examiner

IMAGE GENERATION DEVICE, CAMERA DEVICE, IMAGE DISPLAY DEVICE, AND IMAGE GENERATION METHOD

TECHNICAL FIELD

The present invention relates to an image generation device, a camera device, an image processing system, and an image generation method for generating an output image for display by using a clip image clipped from a wide-angle image taken by a camera.

BACKGROUND OF THE INVENTION AND RELATED ART

A system for generating an output image for display by processing a wide-angle image taken by a camera provided with a wide-angle lens such as a fisheye lens and the like has been proposed. As one of those image processing systems, a system for generating a clip image including a target from the image and displaying/outputting it is known.

Figure 7:
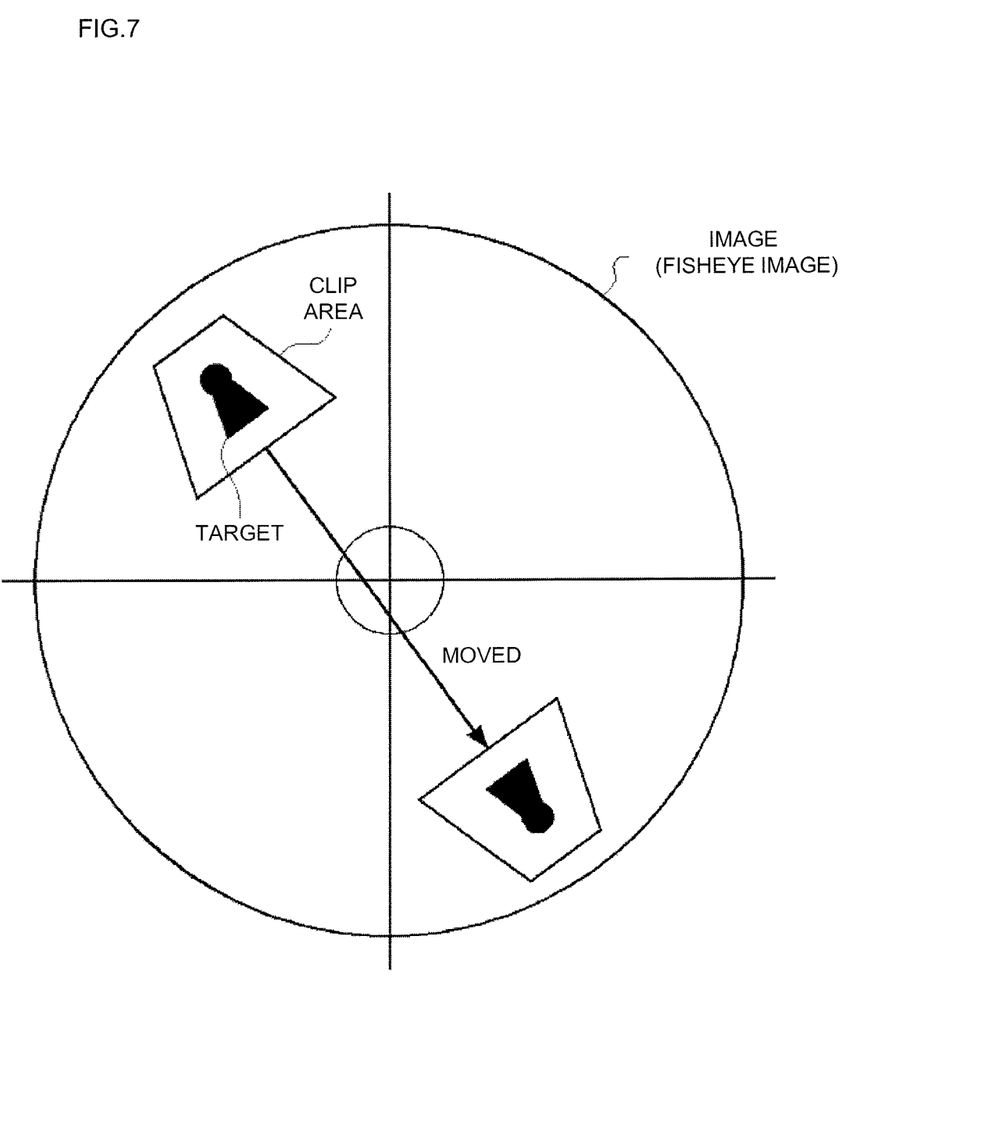
FIG. 7 is an explanatory view of a clip area in an image taken by a fisheye lens.

As illustrated in FIG. 7, when a predetermined area is to be clipped from a image obtained by using a wide-angle lens such as a fisheye lens, the target is inclined in accordance with a position of the target. Thus, when a clip image is to be generated from the image, rotation processing according to the inclination is generally executed.

However, an orientation of the target in the clip image to be displayed is changed largely and rapidly by an influence of processing for rotating the clip image, and there is a problem that the display image is hard to be seen. This is particularly remarkable when a image obtained by a fisheye lens (see FIG. 7) with which an orientation of a target is inverted with respect to a center of the image is used or when the camera is installed on a ceiling or the like so that an optical axis direction of the lens goes vertically and the target passes in the vicinity immediately under the camera.

SUMMARY OF INVENTION

The present invention was made in the above described background. An object of the present invention is to suppress a rapid change of an orientation of a target in a clip image to be displayed.

An aspect of the present invention is an image generation device. This image generation device is an image generation device for generating a clip image from a wide-angle image and is provided with a reference angle determination unit for obtaining a reference angle of a clip area in the wide-angle image, a rotation angle storage unit for storing a rotation angle of a previous clip image, a rotation angle calculation unit for obtaining the rotation angle with respect to the clip area on the basis of a previous rotation angle and the reference angle, and an image clip unit for generating the clip image with respect to the clip area on the basis of the rotation angle obtained by the rotation angle calculation unit, in which the rotation angle calculation unit executes control so that a change amount of the rotation angle of the clip area does not exceed a predetermined angle.

As will be described below, the present invention has another aspect. Therefore, this disclosure of invention is intended to provide an aspect of a part of the present invention and is not intended to limit a range of the invention described and claimed here.

DETAILED DESCRIPTION OF PREFERRED EMBODIMENTS

The present invention will be described below in detail. However, the detailed description below and the attached drawings do not limit the invention.

A camera device of the present invention is provided with an imaging unit for generating an area image which is an image obtained by shooting the area from above and a display image generation unit for generating a display image of a target moving in the area by using a clip image clipped from the area image, in which the display image generation unit is provided with a rotation angle calculation unit for calculating a rotation angle by which the clip image is rotated when the display image is generated, an image clip unit for generating the display image by rotating the clip image on the basis of the rotation angle, a rotation angle storage unit for storing the rotation angle used for rotation of the clip image, and a reference angle determination unit for determining a reference angle which is an angle corresponding to inclination of the target in the area image, and the rotation angle calculation unit has a configuration for calculating the rotation angle of a current frame on the basis of the rotation angle of the previous frame stored in the rotation angle storage unit and the reference angle of the current frame determined by the reference angle determination unit.

By means of this configuration, an appropriate display image of the target moving in the area can be generated by using a clip image clipped from an image obtained by shooting the area from above (area image). In this case, the rotation angle of the current frame is calculated on the basis of the rotation angle of the previous frame and the reference angle of the current frame, the clip image is rotated on the basis of the rotation angle, and the display image is generated. As a result, a rapid change of an orientation of the target displayed in the display image can be suppressed.

Moreover, in the camera device of the present invention, the display image generation unit is provided with a reference position determination unit for determining a clip reference position which is a position corresponding to the target in the area image and is a position which becomes a reference when the clip image is to be clipped from the area image, and a distance calculation unit for calculating a distance between a reference position which is a position corresponding to the imaging unit in the area image and the clip reference position, and the image clip unit has a configuration for generating the display image by rotating the clip image on the basis of the rotation angle when the distance is not more than a predetermined threshold distance.

By means of this configuration, when a distance between a position corresponding to the target (clip reference position) and a position corresponding to the imaging unit (reference position) is small, that is, the target passes in the vicinity immediately below the imaging unit (camera device), a rapid change of the orientation of the target displayed in the display image can be suppressed.

A system of the present invention is an image processing system provided with a camera device for generating an area image which is an image obtained by shooting an area from above and an image processing device for generating a display image of the target moving in the area by using a clip image clipped from the area image, in which the image processing device has a rotation angle calculation unit for calculating a rotation angle by which the clip image is rotated when the display image is to be generated, an image clip unit for generating the display image by rotating the clip image on the basis of the rotation angle, a rotation angle storage unit for storing the rotation angle used for rotation of the clip image and a reference angle determination unit for determining a reference angle which is an angle corresponding to inclination of the target in the area image, and the rotation angle calculation unit has a configuration for calculating the rotation angle of a current frame on the basis of the rotation angle of the previous frame stored in the rotation angle storage unit of the image processing device and the reference angle of the current frame determined by the reference angle determination unit.

By means of this system, too, the rotation angle of the current frame is calculated on the basis of the rotation angle of the previous frame and the reference angle of the current frame similarly to the above, and the display image is generated by rotating the clip image on the basis of the rotation angle and thus, a rapid change of an orientation of the target displayed in the display image can be suppressed.

A method of the present invention is an image processing method for generating a display image of a target moving in the area by using a clip image clipped from an area image which is an image obtained by shooting the area from above, in which a reference angle which is an angle corresponding to inclination of the target in the area image is determined in order to generate the display image by rotating the clip image, a rotation angle of the current frame is calculated on the basis of the rotation angle of the previous frame of the clip image and the reference angle of the current frame, and the clip image is rotated on the basis of the calculated rotation angle so as to generate the display image.

By means of this method, too, the rotation angle of the current frame is calculated on the basis of the rotation angle of the previous frame and the reference angle of the current frame similarly to the above, and the display image is generated by rotating the clip image on the basis of the rotation angle and thus, a rapid change of the orientation of the target displayed in the display image can be suppressed.

According to the present invention, a rapid change of the orientation of the target displayed in the display image can be suppressed, and a sense of discomfort on an appearance caused by rotation of the display image can be mitigated.

An image processing system of an embodiment of the present invention will be explained below by using the attached drawings. In this embodiment, a case in which an imaging unit having a camera function is installed as a monitor camera in offices, shops, stations and the like, and a video of an area is taken is exemplified.

First Embodiment

A configuration of an image processing system of a first embodiment of the present invention will be explained by referring to the attached drawings.

Figure 1:
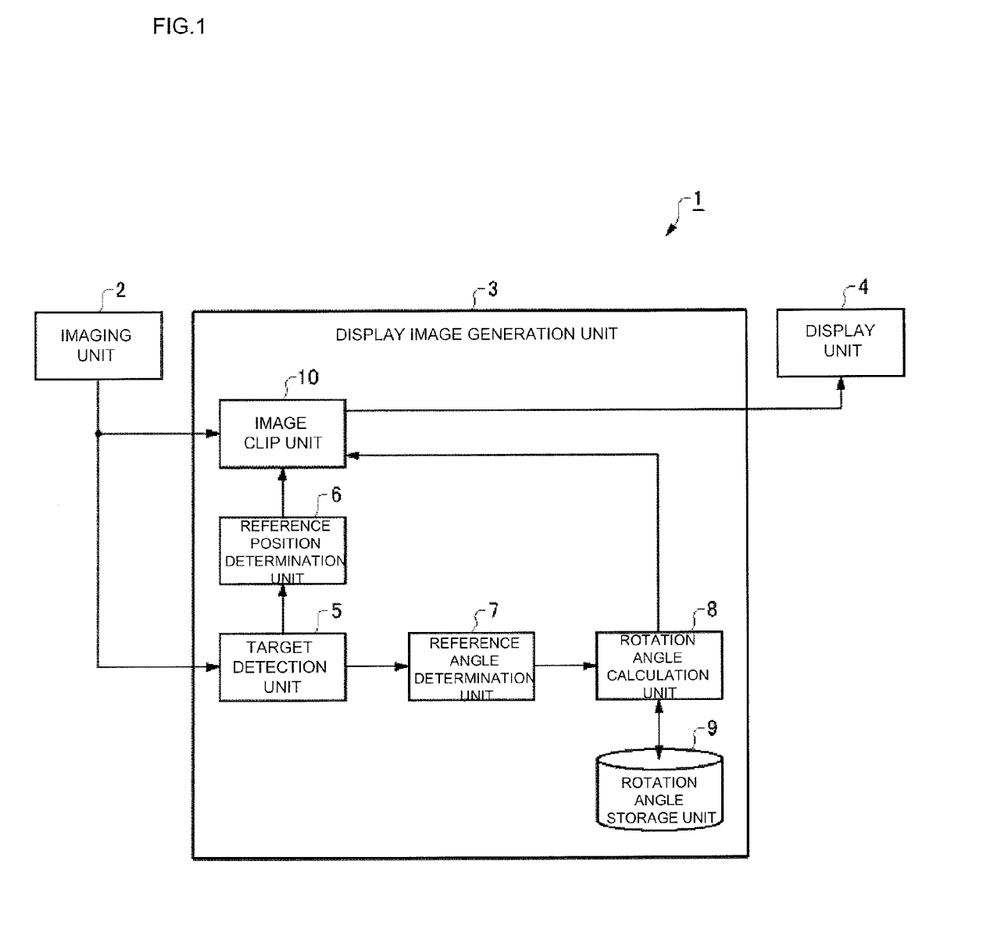
FIG. 1 is a block diagram of an image processing system in a first embodiment of the present invention.

FIG. 1 is a block diagram illustrating a configuration of the image processing system of the first embodiment.

As illustrated in FIG. 1, the image processing system 1 is provided with an imaging unit 2 for taking an area image, a display image generation unit 3 for generating a display image by applying predetermined image processing which will be described later to an image taken by the imaging unit 2, and a display unit 4 for displaying the display image generated by the display image generation unit 3.

The imaging unit 2, the display image generation unit 3, and the display unit 4 may be constituted as a single device or constituted by separate devices. Moreover, it may be so configured that the imaging unit 2 and the display image generation unit 3 are constituted as a single camera device, and the display unit 4 is realized by a display terminal connected to the camera device via an IP network. Moreover, it may be so configured that the imaging unit 2 is constituted as a camera device, and the display image generation unit 3 and the display unit 4 are realized by a personal computer, a tablet terminal and the like connected to the camera device via the IP network.

In FIG. 1, the imaging unit 2 constitutes an image input device and is provided with at least an image pickup element (not shown) such as a CCD (Charge Coupled Device), a CMOS (Complementary Metal Oxide Semiconductor) and the like and a lens (not shown) disposed on an optical axis of the image pickup element.

As the lens of the imaging unit 2, a lens having an angle of view wider than a standard lens (such as a fisheye lens, a semi-wide angle lens, a wide-angle lens a super-wide angle lens and the like, for example) is used in order to cover a wider area as an area with one camera. The imaging unit 2 is installed on a ceiling of the area or the like so that a direction of the optical axis goes in a vertical direction in order to efficiently photograph a wide area. Therefore, the imaging unit 2 generates an image obtained by shooting the area from above (an image taken with an angle of view as if looking down from the ceiling). The imaging unit 2 may be installed on a floor, a desk or the like so as to photograph a target from below.

Figure 2:
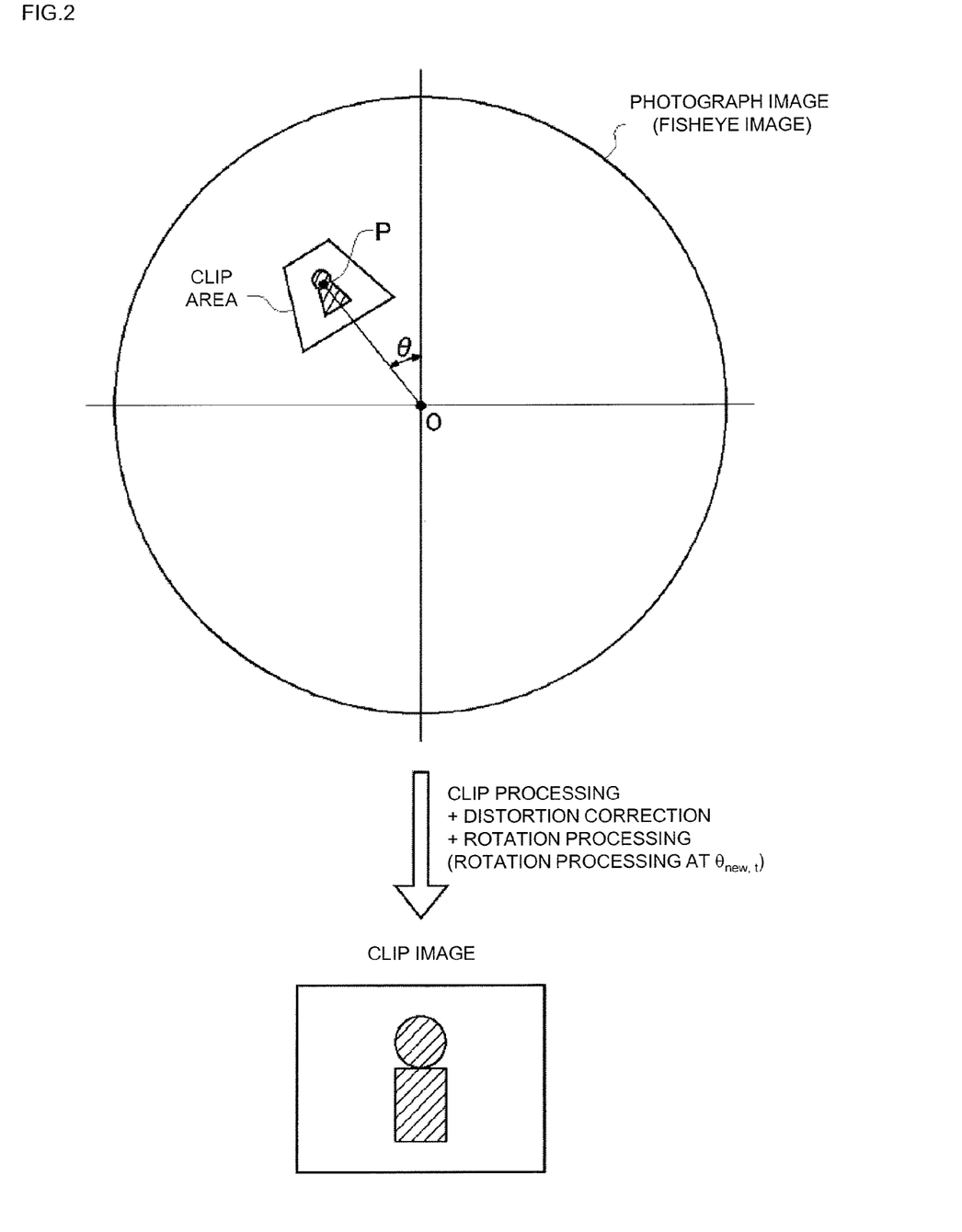
FIG. 2 is an explanatory view of generation processing of a display image in the first embodiment of the present invention.

The display image generation unit 3 generates a clip image for display including a target such as a person or the like moving in the area from the wide-angle image taken by the imaging unit 2 (see FIG. 2). The display image generation unit 3 is provided with a target detection unit 5, a reference position determination unit 6, a reference angle determination unit 7, a rotation angle calculation unit 8, a rotation angle storage unit 9, and an image clip unit 10. Configuration of each of these units will be explained below.

The target detection unit 5 detects a target such as a person, a vehicle and the like included in the area image by applying image processing to the taken image taken by the imaging unit 2. For example, by applying motion difference processing or background difference processing to the image, the target can be detected from the image. The target is not limited to those specified by image processing but may be determined via a specification operation of the target by a user.

The reference position determination unit 6 determines a position which becomes a reference of a clip area including the target in the image (clip reference position) on the basis of a detection result of the target detection unit 5. In this embodiment, a position of the center of gravity of the image area of the detected target is determined as the clip reference position.

This clip reference position can be considered to be a position corresponding to the target in the image. If the target is a moving body, the clip reference position moves with time in accordance with movement of the target. Determination of the clip reference position is not limited to that but a position of a center of a frame surrounding the detected target (a rectangular frame circumscribing a target, for example) may be determined as the clip reference position and other methods may be also used.

The reference angle determination unit 7 determines a reference angle θt in accordance with a position of the clip reference position in the image. For example, the image obtained by the imaging unit 2 through the fisheye lens is as illustrated in FIG. 2. As illustrated in FIG. 2, the angle θt of a clip reference position P with respect to a photograph reference position O is determined as the reference angle. This reference angle θt is also an angle corresponding to inclination of the target in the image.

The rotation angle calculation unit 8 calculates a rotation angle $\theta_{new}$, t for rotating the clip area when the display image is to be generated from the image. The rotation angle $\theta_{new}$, t of the current (time t) frame is calculated by using (Equation 1) on the basis of a rotation angle $\theta_{new}$, t−1 of the previous (time t−1) frame and the reference angle θt of the current (time t) frame.

$$\theta_{new}, t = \theta_{new}, t-1 + \max(\min(\theta t - \theta_{new}, t-1, \alpha) - \alpha) \quad \text{(Equation 1)}$$

Here, $\theta_{new}$, t is a rotation angle used when a clip area is subjected to rotation processing at the time t, and $\theta_{new}$, t−1 is a rotation angle used in the clip image at the time t−1. θt is a reference angle obtained by the reference angle determination unit 7 at the time t. Reference character α is a predetermined threshold value (threshold angle). Moreover, an initial value of $\theta_{new}$, t may be set to 0 degrees.

In the above described (Equation 1), not only that a current (time t) rotation amount $\theta_{new}$, t is obtained by adding a current (time t) increase/decrease amount ($\theta_t - \theta_{new}$, t−1) to the previous (time t−1) rotation angle $\theta_{new}$, t−1, but also the threshold angle α with respect to a rotation change amount ($\theta_t - \theta_{new}$, t−1) from the previous rotation angle $\theta_{new}$, t−1 is set. This means that, if the rotation change amount ($\theta_t - \theta_{new}$, t−1) does not exceed the threshold value α, the rotation change amount ($\theta_t - \theta_{new}$, t−1) is used, while if the rotation change amount ($\theta_t - \theta_{new}$, t−1) exceeds the threshold value α, the rotation change amount is made the threshold angle α.

A user can set an arbitrary angle to the threshold angle α. The threshold angle α may be a fixed value or a variable value. In the case of a fixed value, an angle such as 45°, for example, of a degree that the clip image does not rotate extremely largely from the previous orientation is preferably set. Moreover, in the case of a variable value, the threshold angle α can be made to vary in accordance with a distance r between the photograph reference position O and the clip reference position P. For example, the threshold angle α may be made to vary in accordance with a monotonously increasing function (such as Equation 2 below) in which the threshold angle α becomes the minimum at the distance r=0. In Equation 2 below, A and B are arbitrary positive constants.

$$\alpha = A + B \times r \quad \text{(Equation 2)}$$

Moreover, as another example of the variable value, the angle may be made to vary in accordance with the magnitude of a difference ($\theta_t - \theta_{new}$, t−1) between the reference angle $\theta_t$ and the rotation angle $\theta_{new}$, t−1 of the previous frame. For example, the threshold angle α may be made to vary in accordance with the monotonous increasing function (such as Equation 3 below) in which the threshold angle α becomes the minimum when the difference between the reference angle $\theta_t$ and the rotation angle $\theta_{new}$, t−1 of the previous frame is 0. In Equation 3 below, C and D are arbitrary positive constants.

$$\alpha = C + D \times |\theta_t - \theta_{new}, t-1| \quad \text{(Equation 3)}$$

The rotation angle storage unit 9 stores the rotation angle $\theta_{new}$, t−1 used for rotation of the clip image in the previous (time t−1) frame.

The image clip unit 10 generates the display image from the image. More specifically, the clip image is clipped from the image on the basis of the clip reference position determined by the reference position determination unit 6. Moreover, this image clip unit 10 corrects distortion caused by optical characteristics of the lens used in the imaging unit 2. Moreover, this image clip unit 10 rotates the clip area on the basis of the rotation angle $\theta_{new}$, t calculated by the rotation angle calculation unit 8.

Each unit of the display image generation unit 3 can be realized by using a processor executing a program for each processing and a memory storing information.

An operation of the display image generation unit 3 of the image processing system 1 configured as above will be explained by referring to a flowchart in FIG. 3.

Figure 3:
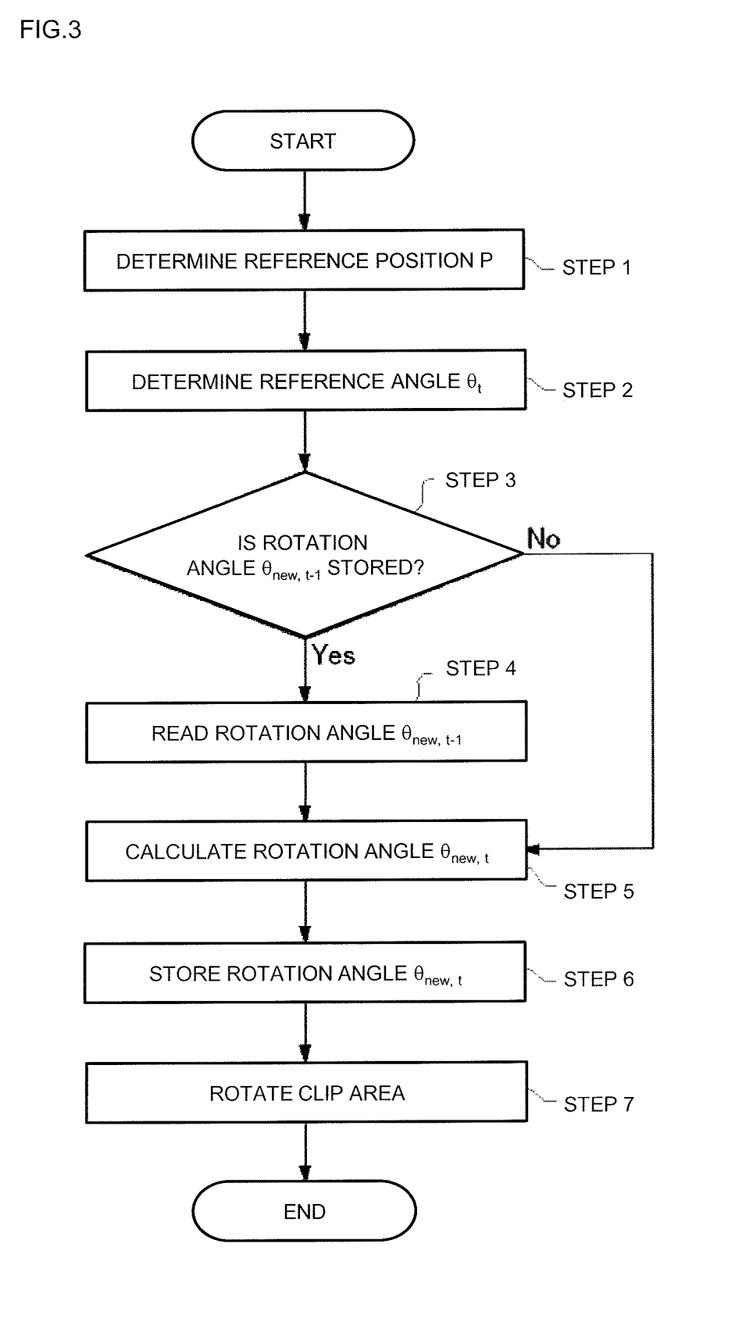
FIG. 3 is an operation flowchart of a display image generation unit in the first embodiment of the present invention.

As illustrated in FIG. 3, when the image at the time t is obtained in the imaging unit 2, the display image generation unit 3 first has the reference position determination unit 6 determine a position (clip reference position) which becomes a reference when a clip area is to be clipped on the basis of target information detected by the target detection unit 5 (Step 1).

Subsequently, the reference angle θt is determined by the reference angle determination unit 7 in accordance with a position of the clip reference position in the image (Step 2).

The rotation angle calculation unit 8 determines whether or not the rotation angle $\theta_{new}$, t−1 to the previous frame is stored in the rotation angle storage unit 9 (Step 3), and if the rotation angle $\theta_{new}$, t−1 is stored, the rotation angle $\theta_{new}$, t−1 is read out (Step 4). Then, by using the rotation angle $\theta_{new}$, t−1 to the previous frame and the reference angle θt to the current frame, the rotation angle $\theta_{new}$, t to the current frame is calculated on the basis of the above described Equation 1 (Step 5).

Then, the rotation angle calculation unit 8 stores or updates the rotation angle $\theta_{new}$, t in the rotation angle storage unit 9 (Step 6), and the image clip unit 10 rotates the clip area by using the rotation angle $\theta_{new}$, t and obtains the clip image (Step 7). The clip image is outputted to the display unit 4 (Step 8).

As described above, according to the image processing system 1 of the first embodiment, when the clip area in the image is subjected to rotation processing, the rotation angle can be suppressed, and thus, a rapid change of the orientation of the target displayed on the display unit 4 can be suppressed.

Second Embodiment

Subsequently, an image processing system of a second embodiment of the present invention will be explained.

In this embodiment, a difference from the first embodiment will be mainly explained. Unless particularly referred to here, a configuration and an operation of this embodiment are similar to those in the first embodiment.

Figure 4:
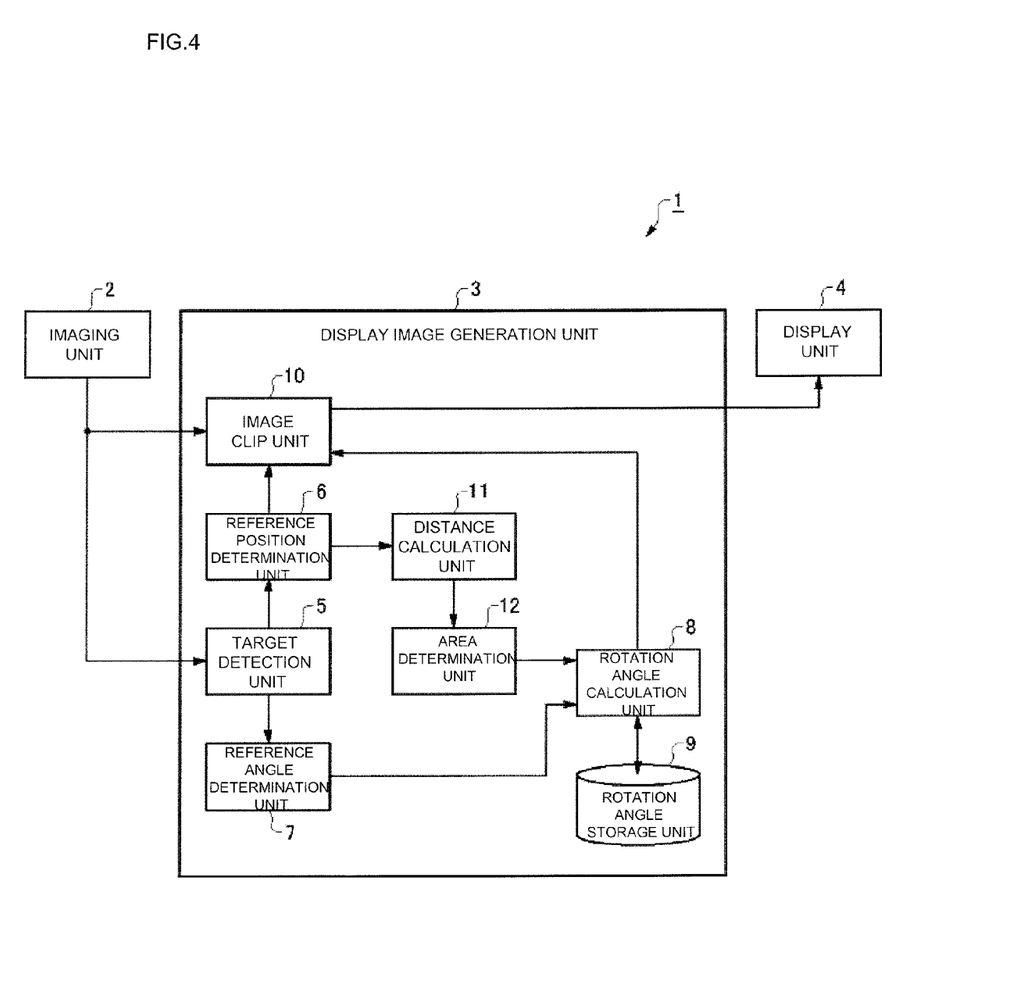
FIG. 4 is a block diagram of an image processing system in a second embodiment of the present invention.
Figure 5:
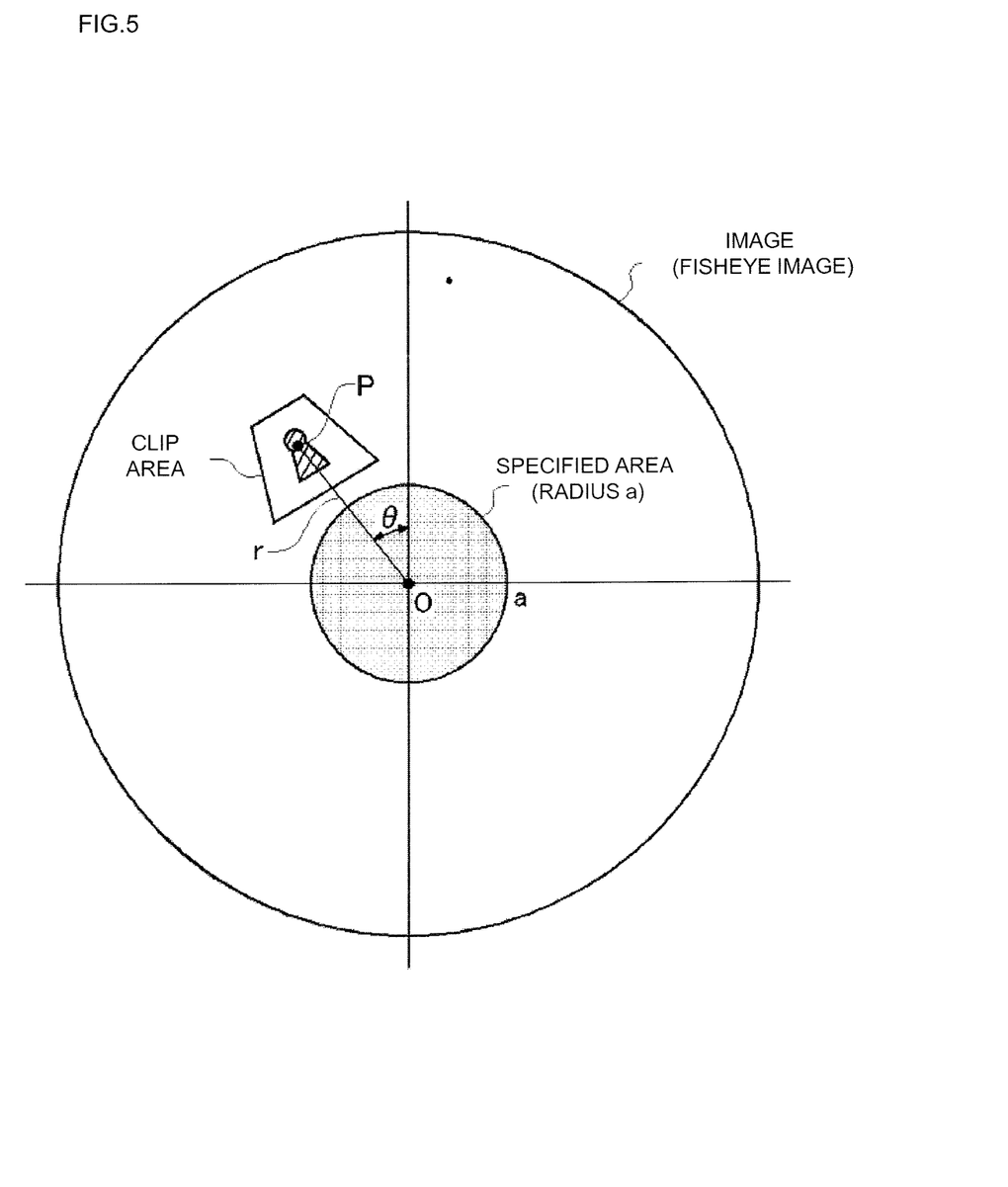
FIG. 5 is an explanatory view of area determination in the second embodiment of the present invention.

FIG. 4 is a block diagram illustrating a configuration of the image processing system of the second embodiment, and FIG. 5 is an explanatory view of area determination in the second embodiment of the present invention. The display image generation unit 3 of the image processing system 1 in this embodiment is provided with a distance calculation unit 11 and an area determination unit 12 in addition to the configuration illustrated in the first embodiment.

As illustrated in FIGS. 4 and 5, the distance calculation unit 11 calculates the distance r between the position O (photograph reference position) corresponding to the imaging unit 2 in the image and the clip reference position P determined by the reference position determination unit 6.

If the imaging unit 2 is provided with a fisheye lens, the image becomes a circle as illustrated in FIG. 5. The photograph reference position O becomes the center of the image (fisheye image). Therefore, the distance calculation unit 11 calculates the distance r between the clip reference position P determined by the reference position determination unit 6 and the photograph reference position O. This distance r may be calculated in pixel number in the area image or may be calculated in a value (meters or the like) converted to an actual distance.

The area determination unit 12 determines whether or not the target included in the image is within a predetermined specified area (a circular area with a radius a around the photograph reference position O, for example). More specifically, the area determination unit 12 determines whether or not the distance r calculated by the distance calculation unit 11 is not more than the radius a. This radius a can be set by the user as appropriate. The radius a is set to 10 m, for example. This specified area can be set to the whole area of the area. In that case, the radius a is set to indefinite.

The rotation angle calculation unit 8 calculates the rotation angle by which the clip area is rotated when the display image is generated from the image. In this case, as will be explained below, the rotation angle when the target is outside the specified area and the rotation angle when the target is within the specified area are calculated by different methods.

If the target is outside the specified area, the rotation angle calculation unit 8 determines the reference angle θt as the rotation angle, and the image clip unit 10 obtains the display image without inclination by rotating the clip area on the basis of the rotation angle θt. On the other hand, if the target is within the specified area, the rotation angle calculation unit 8 obtains the rotation angle $\theta_{new}$, t by using the method illustrated in the Embodiment 1. The image clip unit 10 can suppress a rapid change of the orientation of the target displayed in the display image by rotating the clip area on the basis of the rotation angle $\theta_{new}$, t.

Figure 6:
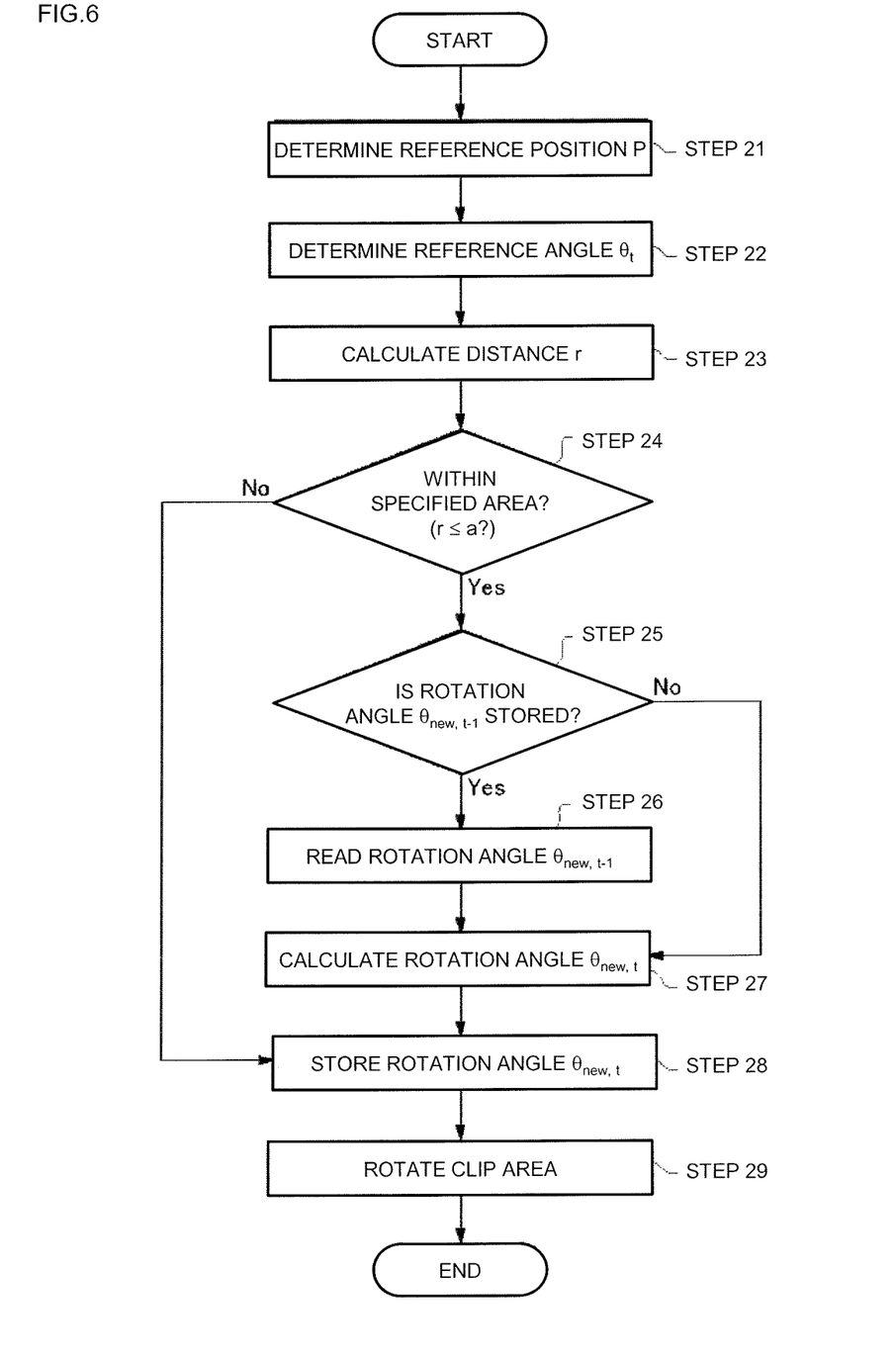
FIG. 6 is an operation flowchart of a display image generation unit in the second embodiment of the present invention.

In the image processing system configured as above, an operation of the display image generation unit 3 in this embodiment will be explained by referring to a flowchart illustrated in FIG. 6.

When the rotation processing of the clip image is to be executed in the camera device of the second embodiment of the present invention, the position P which becomes the reference when the clip image is to be clipped (clip reference position) is determined first (Step 21), and the reference angle θt is determined in accordance with the position of the clip reference position P in the image (Step 22).

Subsequently, the distance calculation unit 11 calculates the photograph reference position O, the clip reference position P, and the distance r (Step 23), and the area determination unit 12 determines whether or not the target included in the image is within the specified area (r≤a or not) (Step 24).

If it is determined to be within the specified area, processing at Step 26 to Step 29 is executed similarly to the first embodiment.

On the other hand, if it is determined by the area determination unit 12 to be not within the specified area at Step 24, the rotation angle calculation unit 8 makes the reference angle θt the rotation angle ($\theta_{new}$, t=θt) and stores the rotation angle in the storage unit 9 (Step 28).

By means of the image processing system of the second embodiment as above, too, the working effect similar to that of the first embodiment can be realized.

In addition, in this embodiment, since the rotation angle calculation method of the clip area is changed in accordance with the area of the image, a rapid and large change of the orientation of the target can be also suppressed while a load of the image clip processing is suppressed.

The first and second embodiments of the present invention are explained as above, but the range of the present invention is not limited to them but the present invention is capable of various changes and variations within a range not changing the essence of the invention.

The preferred embodiments of the present invention that can be thought of at present are explained as above, but it should be understood that various variations are possible to the embodiments, and it is intended that all the variations within the true spirit and the range of the present invention are included in the appended claims.

This application claims priority to Japanese Patent Application No. 2012-084063 filed on Apr. 2, 2012, the entire contents of which are incorporated by reference herein.

What is claimed is:

1. An image generation device for generating a clip image from a wide-angle image, comprising:
    a reference angle determination unit for obtaining a reference angle of a clip area in the wide-angle image;
    a rotation angle storage unit for storing a rotation angle of a previous clip image;
    a rotation angle calculation unit for obtaining the rotation angle with respect to the clip area on the basis of a previous rotation angle and the reference angle; and
    an image clip unit for generating the clip image with respect to the clip area on the basis of the rotation angle obtained by the rotation angle calculation unit, wherein
    the rotation angle calculation unit executes control so that a change amount of the rotation angle of the clip area does not exceed a predetermined angle.

2. The image generation device according to claim 1, wherein
    the change amount of the rotation angle of the clip area is a difference between the previous rotation angle and the reference angle.

3. The image generation device according to claim 1, wherein
    the rotation angle calculation unit makes the predetermined angle the change amount of the rotation angle of the clip area when the change amount of the rotation angle of the clip area exceeds the predetermined angle.

4. The image generation device according to claim 1, further comprising:
    a reference position determination unit for determining a reference position of a clip area in a wide-angle image.

5. The image generation device according to claim 4, further comprising:
    a target detection unit for detecting a target included in the wide-angle image, wherein
    the reference position determination unit determines a reference position of the clip area on the basis of the target.

6. The image generation device according to claim 1, wherein
    the wide-angle image is taken by using a fisheye lens.

7. The image generation device according to claim 1, wherein
the wide-angle image is taken from above.

8. The image generation device according to claim 1, wherein
if the clip area is present in a predetermined area of the wide-angle image, the image clip unit executes control so that a change amount of the rotation angle of the clip area does not exceed a predetermined angle.

9. The image generation device according to claim 8, wherein
the predetermined area is determined on the basis of a photograph reference position of the wide-angle image.

10. The image generation device according to claim 9, further comprising:
a reference position determination unit for determining a reference position of the clip area in the wide-angle image; and an area determination unit for determining whether or not the clip area is included in the predetermined area on the basis of a distance between the reference position and the photograph reference position of the wide-angle image.

11. A camera device for generating a clip image from a wide-angle image, comprising:
an imaging unit for taking a wide-angle image;
a reference angle determination unit for obtaining a reference angle of the clip area in the wide-angle image taken by the imaging unit;
a rotation angle storage unit for storing a rotation angle of a previous clip image;
a rotation angle calculation unit for obtaining the rotation angle to the clip area on the basis of a previous rotation angle and the reference angle; and
an image clip unit for generating the clip image with respect to the clip area on the basis of the rotation angle obtained by the rotation angle calculation unit, wherein
the rotation angle calculation unit executes control so that a change amount of the rotation angle of the clip area does not exceed a predetermined angle.

12. An image display device for generating a clip image from a wide-angle image, comprising:
a reference angle determination unit for obtaining a reference angle of a clip area in the wide-angle image;
a rotation angle storage unit for storing a rotation angle of a previous clip image;
a rotation angle calculation unit for obtaining the rotation angle with respect to the clip area on the basis of a previous rotation angle and the reference angle;
an image clip unit for generating the clip image with respect to the clip area on the basis of the rotation angle obtained by the rotation angle calculation unit; and
a display unit for displaying the clip image, wherein
the rotation angle calculation unit executes control so that a change amount of the rotation angle of the clip area does not exceed a predetermined angle.

13. An image generation method for generating a clip image from a wide-angle image, comprising steps of:
obtaining a reference angle of a clip area in the wide-angle image;
obtaining a rotation angle of the clip image on the basis of the stored rotation angle of a previous clip image and the reference angle; and
generating the clip image with respect to the clip area on the basis of the rotation angle obtained in the step, wherein
when the rotation angle of the clip area is to be obtained, control is executed so that a change amount of the rotation angle of the clip image does not exceed a predetermined angle ($\alpha$).

* * * * *